United States Patent
Kraan

[19]

[11] Patent Number: 6,009,792
[45] Date of Patent: Jan. 4, 2000

[54] APPARATUS FOR PREPARING COFFEE

[75] Inventor: Diederik Kraan, Apeldoorn, Netherlands

[73] Assignee: Sara Lee/DE N.V., Utrecht, Netherlands

[21] Appl. No.: 09/162,834

[22] Filed: Sep. 29, 1998

[30] Foreign Application Priority Data

Sep. 30, 1997 [NL] Netherlands ............................ 1007169

[51] Int. Cl.[7] .............................. A47J 31/40; A47J 31/06
[52] U.S. Cl. .............................. 99/295; 99/302 R; 99/307
[58] Field of Search ................................. 99/295, 302 R, 99/307, 289 R

[56] References Cited

U.S. PATENT DOCUMENTS

| | | |
|---|---|---|
| 2,205,290 | 6/1940 | Herrera . |
| 3,270,659 | 9/1966 | Tavera ........................................ 99/295 |
| 3,878,772 | 4/1975 | Nordskog .................................. 99/295 |
| 5,638,741 | 6/1997 | Cisaria ...................................... 99/295 |
| 5,794,519 | 8/1998 | Fischer ...................................... 99/295 |

FOREIGN PATENT DOCUMENTS

| | | |
|---|---|---|
| 74 30 108 | 3/1976 | Germany . |
| 74 30 109 | 3/1976 | Germany . |
| 939813 | 10/1963 | United Kingdom . |

| | | |
|---|---|---|
| WO 94/02059 | 2/1994 | WIPO . |

*Primary Examiner*—Reginald L. Alexander
*Attorney, Agent, or Firm*—Merchant & Gould

[57] ABSTRACT

An apparatus for preparing coffee, with a holder arranged for receiving a pouch made of filter material and filled with a product to be extracted. The holder has at least one outflow opening and an access opening for placing the pouch in the holder. The apparatus has a cover for closing and releasing the access opening and a clamping device for pressing the holder and the cover towards each other when the cover closes off the access opening of the holder. The clamping device engages at least a position of the cover located on an external surface of the cover. The apparatus has a housing to which the holder is detachably connected, the clamping device has a rotation element with a first and second opposite ends. The rotation element is connected adjacent its first end to the housing for rotation about a horizontally directed first rotation axis between a first and second rotational position for closing the access opening in the second rotational position and releasing it in the first rotational position. The apparatus has a closing arrangement for detachably connecting the rotation element to the housing adjacent the second end when the cover closes off the access opening. The cover is connected to the rotation element such that in the second rotational position the rotation axis extends along a first side of the cover and the second end is located on a second side of the cover opposite the first side.

19 Claims, 10 Drawing Sheets

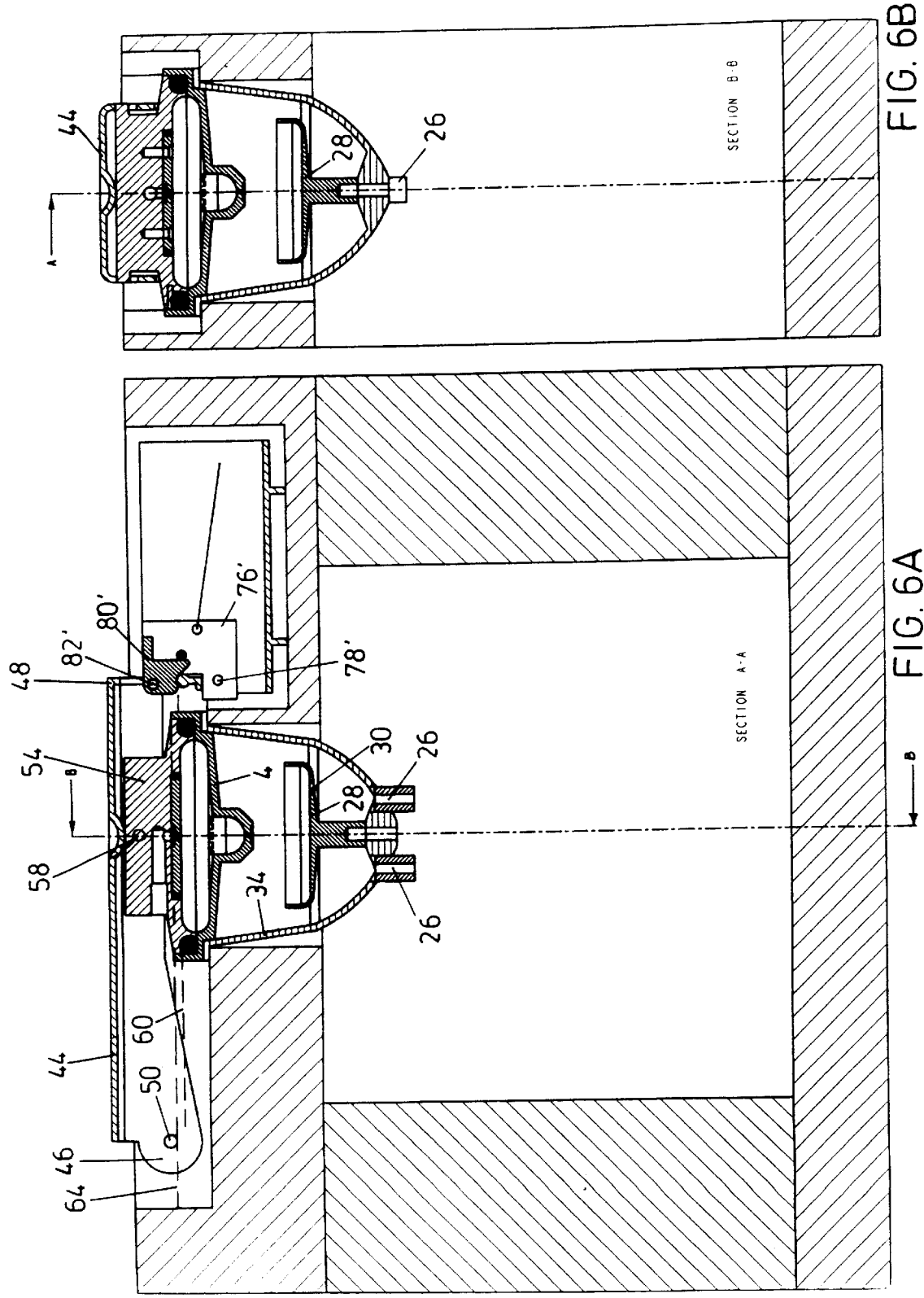

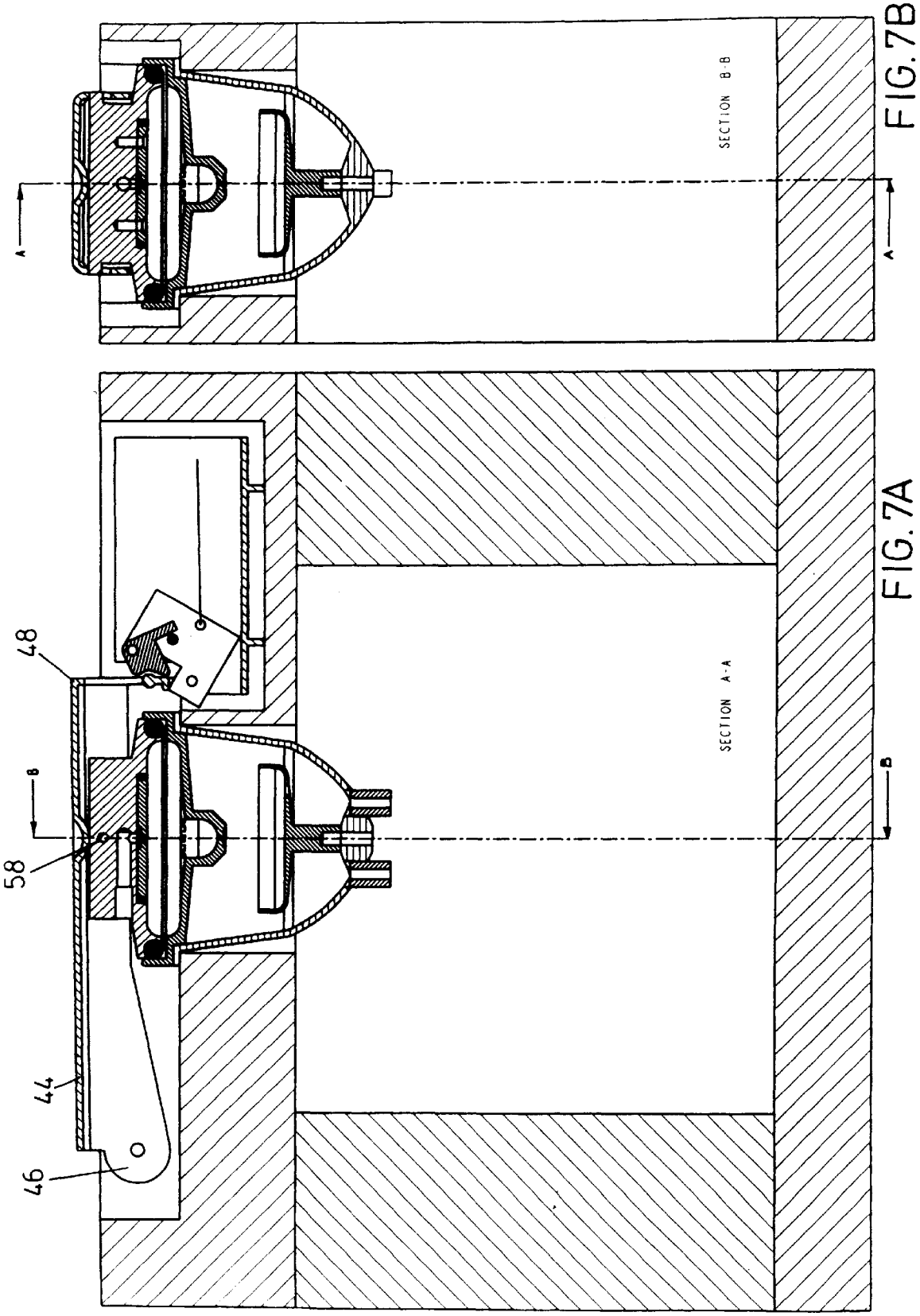

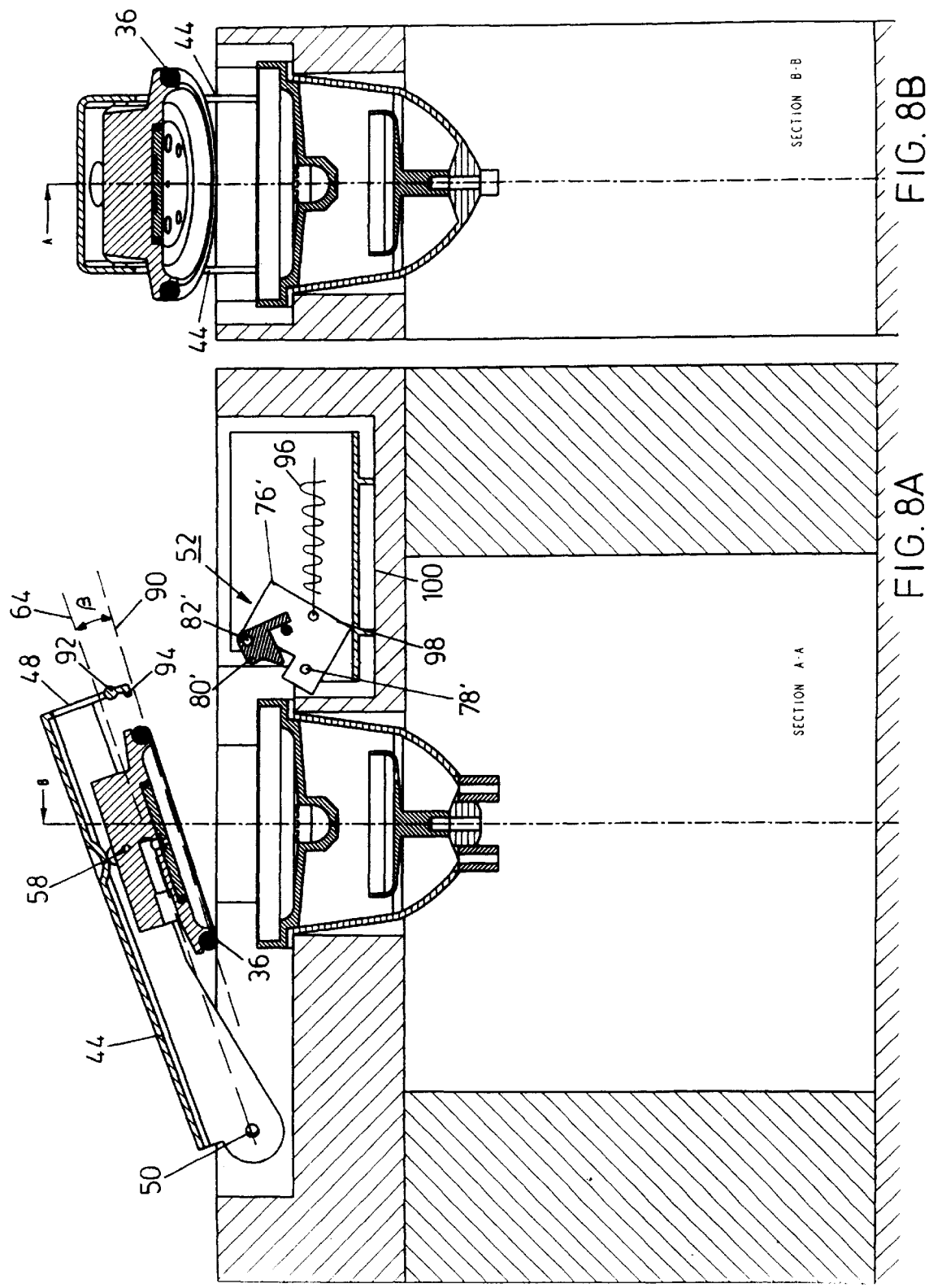

APPARATUS FOR PREPARING COFFEE

FIELD OF THE INVENTION

This invention relates to an apparatus for preparing coffee, comprising a holder arranged for receiving a pouch made of filter material and filled with a product to be extracted, the holder comprising at least one outflow opening and an access opening for placing the pouch in the holder, the apparatus further comprising a cover for closing and releasing the access opening and clamping means for pressing the holder and the cover towards each other when the cover closes off the access opening of the holder.

BACKGROUND OF THE INVENTION

Such an apparatus is known from international patent publication WO 94/02059. In that publication, the apparatus, as shown in FIG. 11, comprises clamping means which engage a circumferential edge of the cover for pressing the cover and the holder towards each other when the cover closes off the holder. A disadvantage of the known apparatus is that the frequent opening and closing of the holder reduces the reliability of the liquid seal between the cover and the holder. When, in use, under high pressure, hot water is supplied to the holder for preparing coffee, it may therefore happen that water leaks from the holder. This is caused by improper closure of the cover and the holder. If water leaks out, even if only to a slight extent, the pressure in the holder decreases. When the pressure in the holder decreases, this leads to a deterioration of the quality of the coffee extract obtained. This is the case in particular when the outflow opening has such a small diameter that the coffee extract spouts from the outflow opening for obtaining coffee with a small-bubble froth layer (cafe creme). When the pressure decreases, however, it may happen that the speed at which the coffee extract spouts from the outflow opening is not sufficient for preparing cafe creme.

SUMMARY OF THE INVENTION

The object of the invention is to provide an apparatus that offers a solution to the above-stated problem. The construction should then be so reliable that even after the holder has frequently been closed and opened again, still a reliable seal between cover and holder can be obtained.

To that end, the apparatus according to the invention is characterized in that the clamping means for pressing the cover and the holder towards each other when the cover closes off the access opening of the holder at least engage a position of the cover located approximately in the center of an external surface of the cover.

What is achieved by virtue of the clamping means engaging approximately at the center of the external surface of the cover is that the force exerted on the cover is uniformly distributed over the cover. As a result, a good liquid seal between the cover and the holder is obtained at all times. To that end, in particular, the external surface is of at least substantially circular design.

According to a preferred embodiment of the apparatus, the apparatus further comprises a housing to which the holder is detachably connected, the clamping means comprising a rotation element with a first and second opposite end, the rotation element being connected, adjacent its first end, to the housing for rotation about a horizontally directed first rotation axis between a first and second rotational position for closing the access opening of the holder in the second rotational position and releasing the access opening again in the first rotational position, the apparatus further comprising a closing arrangement for detachably connecting the rotation element, adjacent its second end, to the housing when the cover closes off the access opening in the second rotational position, the cover being connected to the rotation element such that in the second rotational position, the rotation axis extends along a first side of the cover and the second end is located on a second side of the cover, located opposite the first side.

According to a first further elaboration of this embodiment, the first rotation axis is located above a flat plane through the access opening. An advantage of this embodiment is that the housing can be made of relatively narrow design. In this connection, the apparatus may be further characterized in that the plane defined by the first rotation axis and the second end, and the plane through the opening include an acute angle when the cover closes off the holder in the second rotational position.

In particular, the cover is movably connected to the rotation element, so that the cover, when the holder is being closed, can optimally position itself relative to the holder.

According to a further elaboration, the cover is connected to the rotation element for rotation through a limited angle of rotation about a second rotation axis, the second rotation axis running at least substantially parallel to the first rotation axis. When closing the cover, and a part of the edge of the cover initially engages the holder, it is possible, upon further rotation of the rotation element about the first rotation axis, for the cover to simultaneously rotate through a limited angle about the second rotation axis. This ensures that the cover is positioned optimally relative to the holder, that is, that the cover is positioned such that it seals the holder liquid-tightly. To guarantee, when closing the holder, that the cover and the holder initially engage each other at one point only, the apparatus preferably further comprises spring means which exert such a force on the cover that an underside of the cover comes to lie approximately parallel to the plane defined by the first rotation axis and the second end by rotation of the rotation element about the second rotation axis when the cover is lifted off the holder by rotation of the rotation element about the first rotation axis.

According to a highly advantageous embodiment the spring means comprise a flexible hose which is attached to the cover for supplying hot water to the holder. The flexible hose then has a double function.

According to another variant of the invention, the first rotation axis is located at least substantially in a flat plane through the access opening of the holder. In this variant, the housing will be of slightly wider design than the variant mentioned earlier. In this variant, too, the cover is preferably movably connected to the rotation element.

BRIEF DESCRIPTION OF THE DRAWINGS

The invention will be further explained with reference to the drawings, wherein:

FIG. 5b is a front view of the apparatus of FIG. 1 in the condition according to FIG. 5a;

FIG. 6a is a cross section of a second possible embodiment of an apparatus according to the invention, taken along the plane A—A of FIG. 6b;

FIG. 6b is a cross section of the apparatus taken along the plane B—B of FIG. 6a;

FIG. 7a is a cross section of the apparatus as shown in FIG. 6a upon a first step towards opening the holder;

FIG. 7b is a cross section along the plane B—B of FIG. 7a;

FIG. 8a is a cross section of the apparatus according to FIG. 6a upon a second and final step towards opening the holder;

FIG. 8b is a cross section of the apparatus along the line A—A of FIG. 8a;

FIG. 9b is a cross section along the plane A—A of FIG. 9a.

DETAILED DESCRIPTION OF THE PREFERRED EMBODIMENTS

Referring to FIGS. 1–5b, presently a first embodiment of an apparatus according to the invention will be discussed.

Figure 9A:
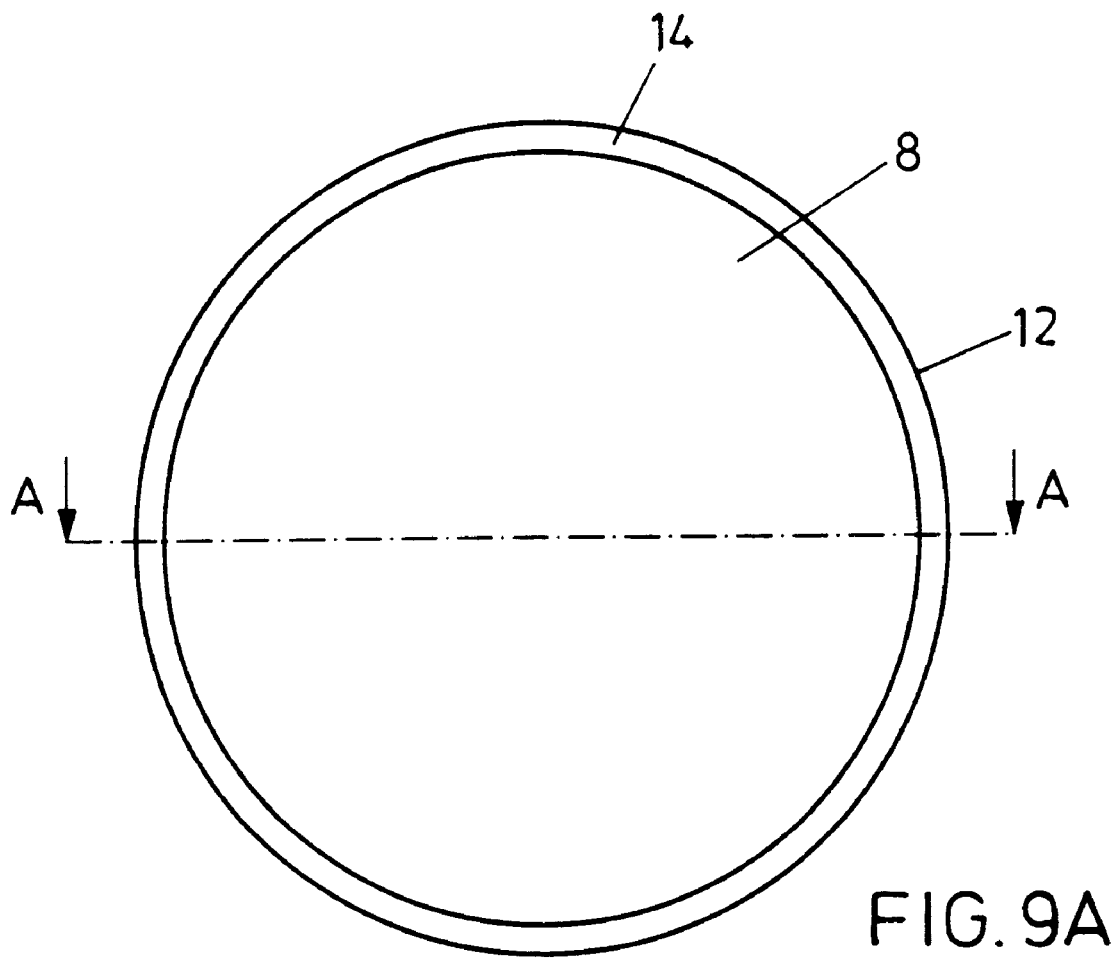
FIG. 9a is a top plan view of a pouch which can be used in the apparatus according to FIG. 1.
Figure 9B:
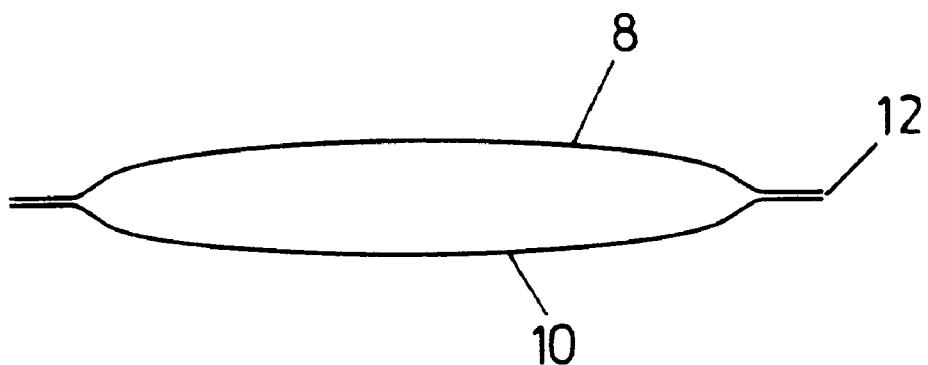

The apparatus 1 for preparing coffee comprises a housing 2 which comprises a holder 4 detachably connected to the housing. The holder 4 is arranged for receiving a pouch 6, as shown in FIGS. 9a and 9b, made of filter material and filled with a product to be extracted, such as ground coffee.

In this example, the pouch 6 consists of an upper sheet 8 and a lower sheet 10, each made of filtering paper. The upper sheet 8 and the lower sheet 10 are each of disc-shaped design and joined together adjacent their peripheral edges 12. This joint forms a circumferential sealing seam 14, closed in itself. The holder 4 is of cup-shaped design and consists of a bottom 16 and an upright, circumferential sidewall 18, connected to the bottom. Provided in the bottom 16 is a recess 20 provided with at least one outflow opening 22. At its upper end, the holder is provided with an access opening 24.

The housing 2 further comprises a liquid receiving space 25 which comprises an outflow opening 26. Placed in the liquid receiving space 25 is a collecting reservoir 28 of cup-shaped design. Provided in a bottom of the collecting reservoir 28 is an opening 30. In this example, the liquid receiving space 25 is formed by a cup-shaped element 32, open at the top, which is so designed at its upper end that the holder 4 can be detachably placed on it.

The apparatus further comprises a cover 34 for closing and releasing the access opening 24 of the holder. At its underside, the cover 34 is fitted with a sealing ring 36 which, in use, can cooperate with the holder 4. At its top, the cover is provided with an inflow opening 38 which, via a liquid duct 40, is connected to a device 42 for heating hot water. The device 42 is of a type known per se, such as, for instance, a hot-water boiler, so that a further explanation on this point can be dispensed with.

The apparatus further comprises a rotation element having a first 46 and second 48 end, located opposite each other. Adjacent its first end 46, the rotation element is connected to the housing 2 for rotation about a horizontally directed first rotation axis 50. The rotation element can rotate about the first rotation axis 50 between a first (see FIG. 5A) and second (see FIG. 1) rotational position. When the rotation element 44 is in the first rotational position, the access opening 24 of the holder 4 is cleared (see FIG. 5A). When, by contrast, the rotation element is in the second rotational position, the holder is closed off, that is, the access opening 24 is closed off by the cover 34 (see FIG. 1).

Figure 1:
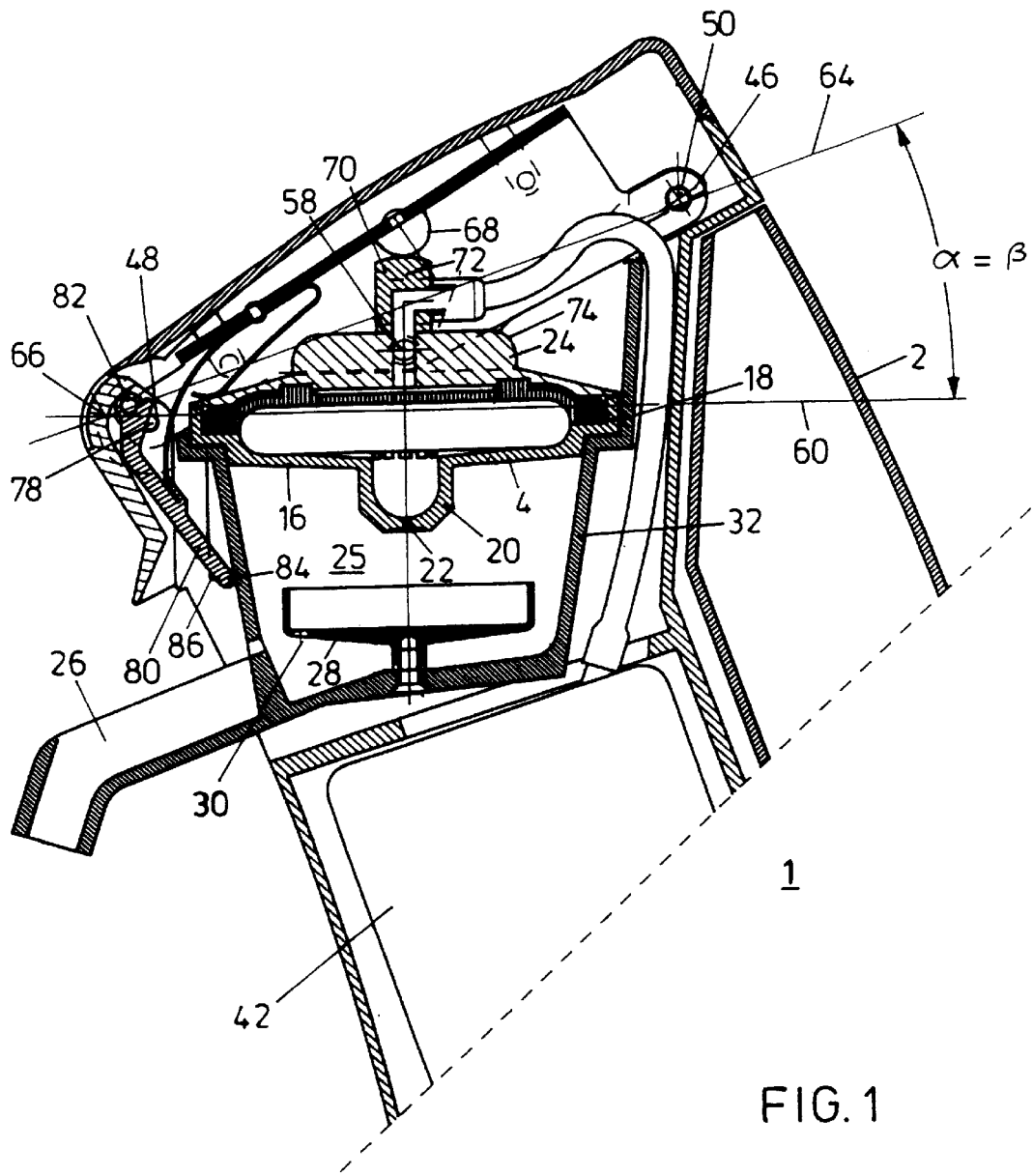
FIG. 1 is a cross section of a first embodiment of an apparatus according to the invention, with a holder closed by a cover.

The apparatus further comprises a closing arrangement 52 for detachably connecting the rotation element to the housing 2, adjacent the second end 48 of the rotation element 44, when the cover 34 closes off the access opening 24 in the second rotational position (see FIG. 1).

Figure 2:
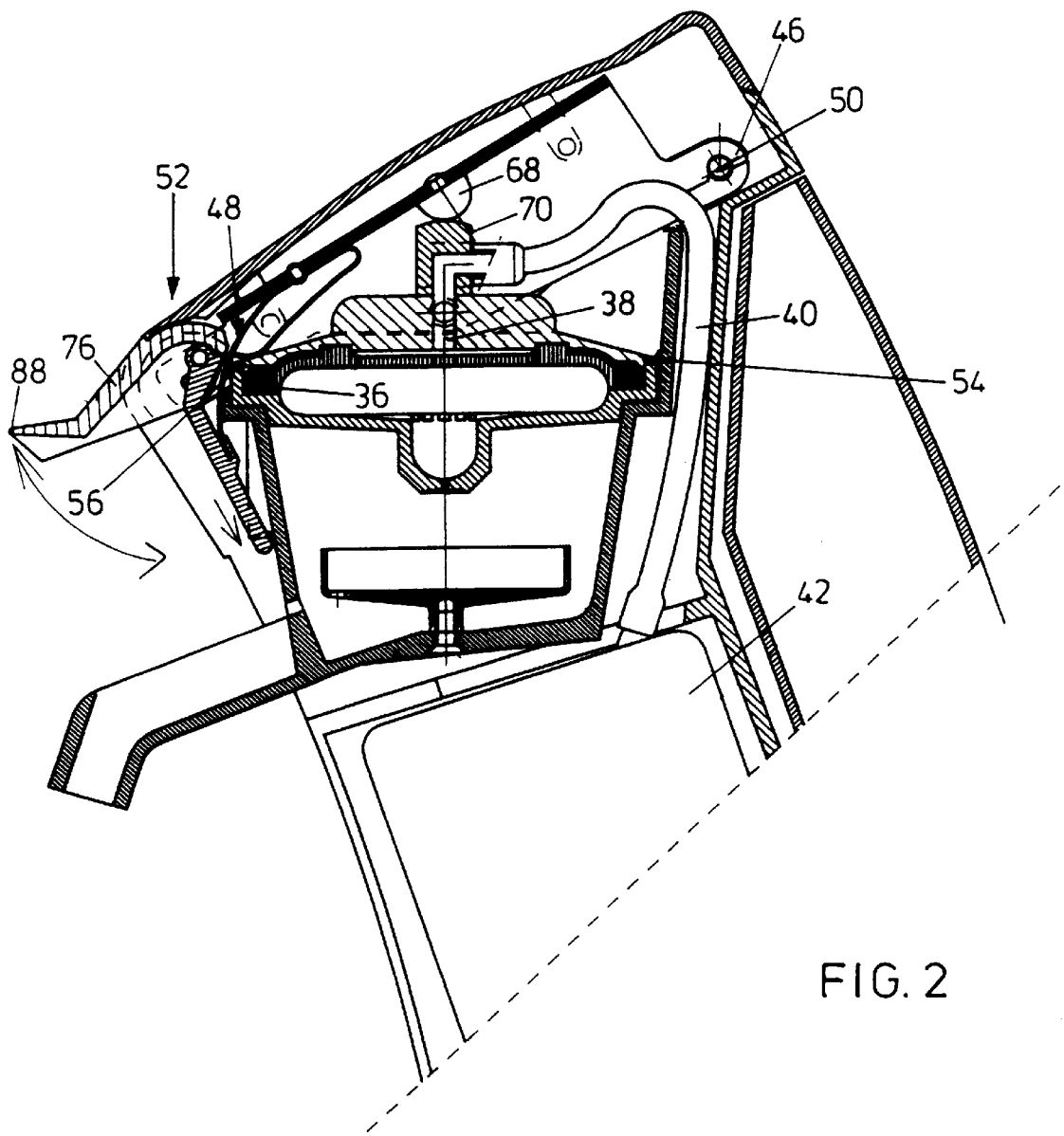
FIG. 2 is a cross section of the apparatus according to FIG. 1 upon a first step towards opening the holder.

As can be properly seen in FIG. 1, the cover is attached to the rotation element 44, such that in the second rotational position the rotation axis 50 extends along a first side 54 of the cover and the second end 48 is located on a second side 56 of the cover, located opposite the first side (see FIG. 2).

The cover 34 is movably connected to the rotation element 44. To that end, as can be properly seen in FIG. 5b, the rotation element comprises two parallel arms 44a en 44b, each provided with an opening 56 through which extends a second rotation axis 58. The second rotation axis 58 is connected with the cover 34. Further, the openings 56 each have a diameter greater than the diameter of the rotation axis 58. This means that the cover is connected to the rotation element 44, not only for rotation about the rotation axis 58, but also for translation over a certain distance.

Characteristic of the embodiment according FIGS. 1–5b is that the first rotation axis 50 is located above a flat plane 60 through the access opening 24 of the holder 4 (FIG. 1). The first rotation axis 50 is parallel to this plane 60. Further, the second rotation axis 58 runs at least substantially parallel to the first rotation axis 50. Thus, the cover is connected to the rotation element 44 for rotation about the second rotation axis through a limited angle of rotation.

As can be properly seen in FIG. 1, the plane 64 defined by the rotation axis 50 and the second end 48, and the plane 60 through the access opening 24 include an acute angle α when the cover closes off the holder in the second rotational position. An intersecting line 66 of the two last-mentioned planes is located adjacent the second end 48.

Figure 5A:
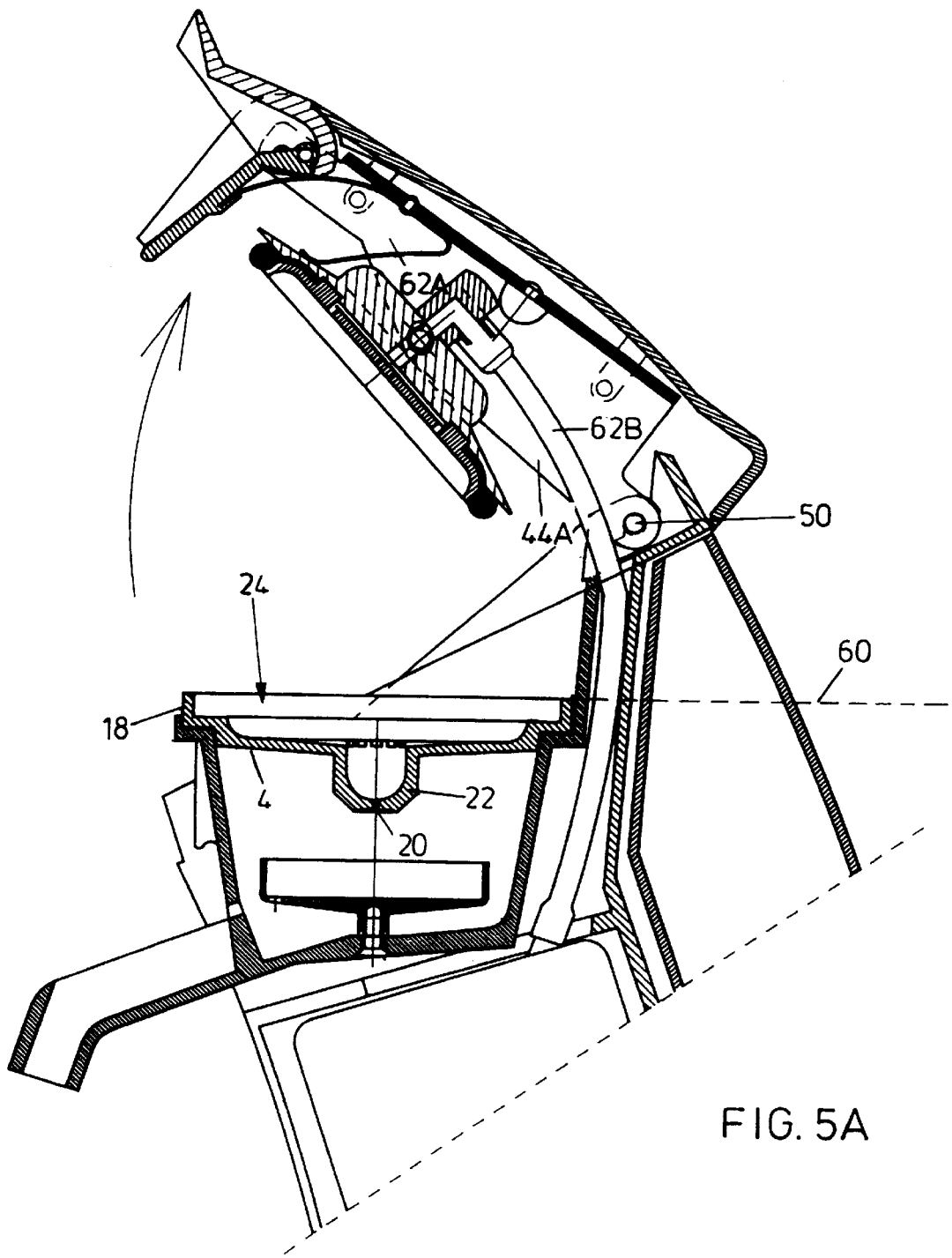
FIG. 5a is a cross section of the apparatus according to FIG. 1 upon a fourth and final step towards opening the holder.

The apparatus further comprises spring means 62a and 62b, which exert such a force on the cover 34 that the cover rotates about the second rotation axis 58 in a direction such that angle α is reduced when the cover is lifted off the holder by rotation of the rotation element 44 about the rotation axis 50 (see also FIG. 5A). In this example, the spring means 62b comprise inter alia the flexible duct 40.

The apparatus further comprises clamping means 68, 70 for pressing the holder and the cover towards each other when the cover closes off the access opening 24 of the holder. According to the invention, the clamping means 68, 70 for pressing the cover 34 and the holder 4 towards each other when the cover closes off the access opening 24 of the holder 4, then engage a position 72 of the cover 34, located approximately in the center of an external surface 74 of the cover. In this example, the external surface 74 is of at least substantially circular design (see FIG. 5b), so that the center of the external surface of the cover coincides with the center of the circle formed by the edge of the outer surface.

The clamping means comprise a knob-shaped pressure part 68 which, in the second rotational position of the rotation element, presses approximately onto the center 72 of the outside 74 of the cover 34 when the cover 34 closes off the access opening 24. The outside of the cover is provided with a knob-shaped element 70 which is engaged by the knob-shaped pressure part 68 when the cover closes off the opening and the rotation element is in the second rotational position.

Figure 3:
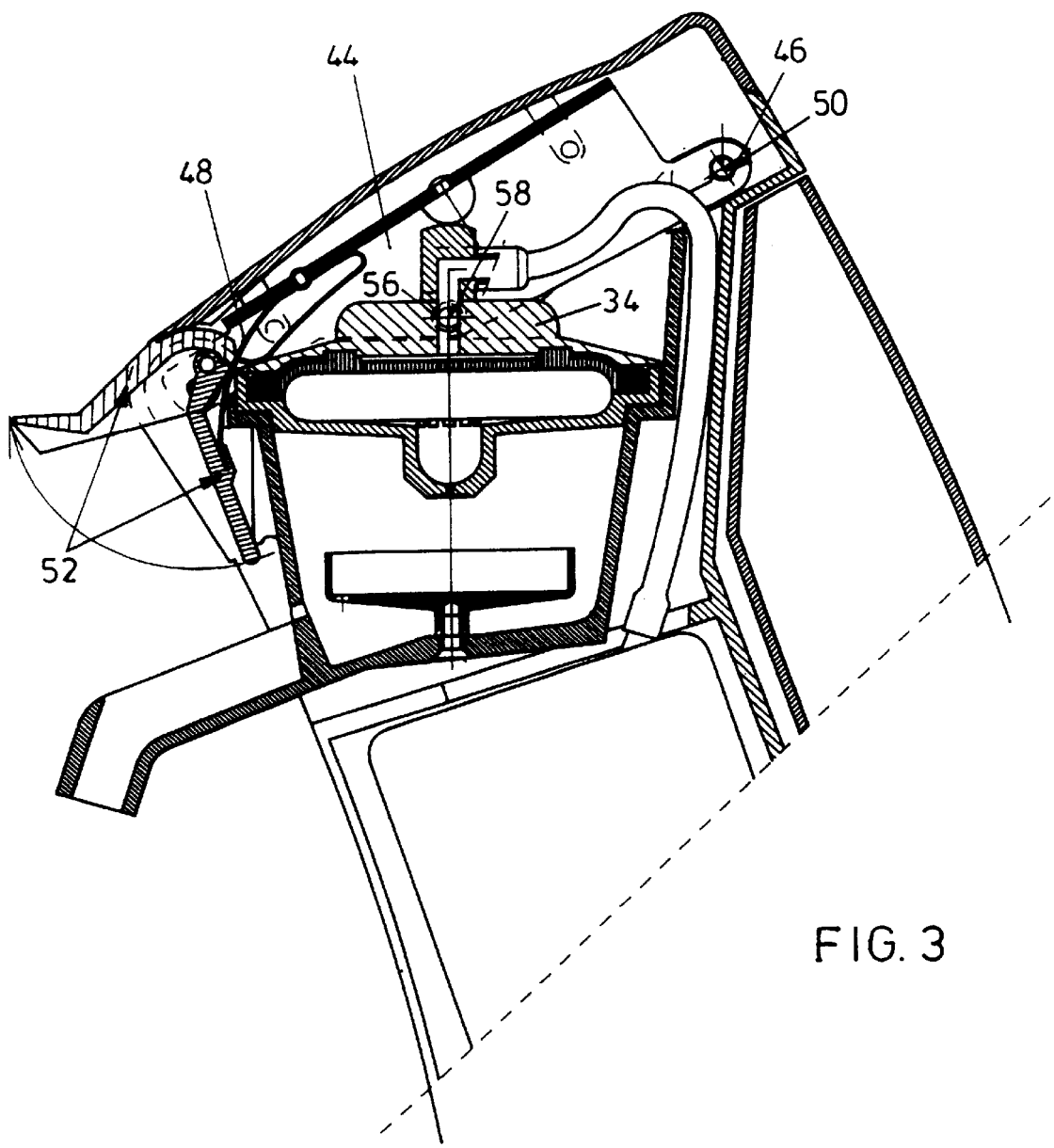
FIG. 3 is a cross section of the apparatus according to FIG. 1 upon a second step towards opening the holder.
Figure 4:
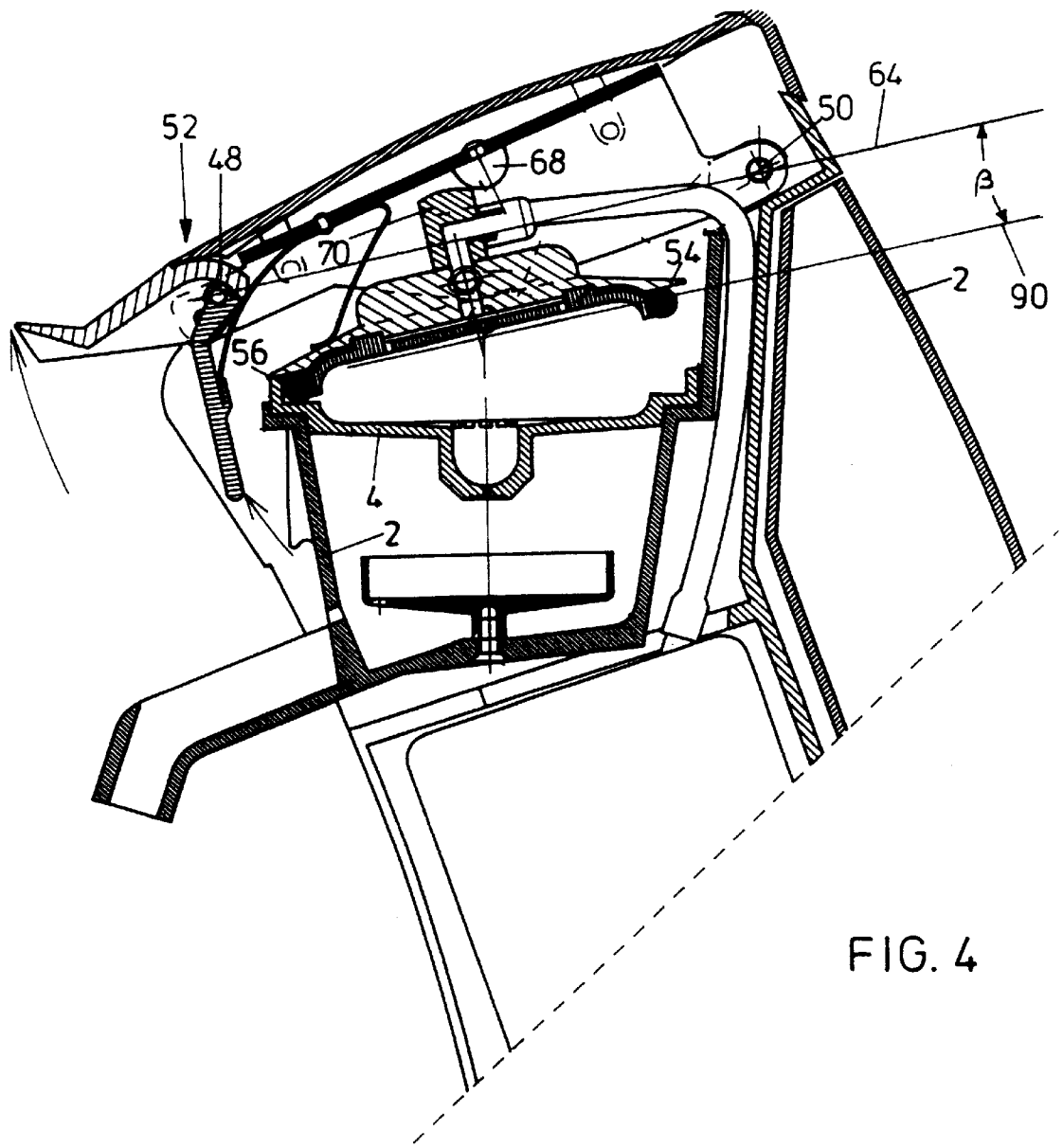
FIG. 4 is a cross section of the apparatus according to FIG. 1 upon a third step towards opening the holder.

The operation of the apparatus is as follows. First, the closing arrangement 52 is operated, so that the cover 34 can be lifted off the holder 4 by rotation of the rotation element 44 about the rotation axis 50. The resultant situation is shown in FIG. 5A. Then the pouch 6 as shown in FIGS. 9a and 9b is placed in the holder 4. To that end, the holder 4 can be removed from the housing 2, whereafter the holder 4, together with the pouch 6, is re-placed in the housing 2. Then the cover can be closed by moving the second end 48 of the rotation element 44 downwards, the rotation element 44 thereby rotating about the first rotation axis 50. The spring means 62a, 62b provide that such a force is exerted on the cover that an underside of the cover comes to lie approximately parallel to the plane defined by the first rotation axis and the second end, by rotation of the rotation element about the second rotation axis when the cover is lifted off the holder by rotation of the rotation element about the first rotation axis. This means that, when closing the cover, the second side 56 of the cover first of all contacts the holder 4. At that time, the knob-shaped pressure part 68 does not press on the knob-shaped element 70 yet. When subsequently the second end 48 is moved further downwards, the first side 54 of the cover will be gradually moved in the direction of the holder 4. In the process, the angle β between the plane 64 and the plane 90 through the underside of the cover 34 will increase. What is effected through this movement is that the cover 34 is placed symmetrically on the holder 4. This situation is shown in FIG. 3.

Thereupon, the closing arrangement 52 is operated, with the result that the second end 48 of the rotation element 44 is pressed down. As a result, the knob-shaped pressure part 68 will press on the knob-shaped element 70 in a vertically downwardly directed direction. The result is that the cover 34 is pressed upon at a position approximately in the center of the external surface of the cover. The force between the sealing ring 36 on the one hand and the holder 4 on the other hand will then be approximately the same at every point of the sealing ring. Hence, the deformation of the sealing ring will likewise be approximately the same at every point of the sealing ring. As a result of this last, in turn, an optimum and reliable seal between cover and holder has been obtained. Then the closing arrangement 52 is further operated (see FIGS. 1 and 2) for locking the rotation element.

Figure 5B:
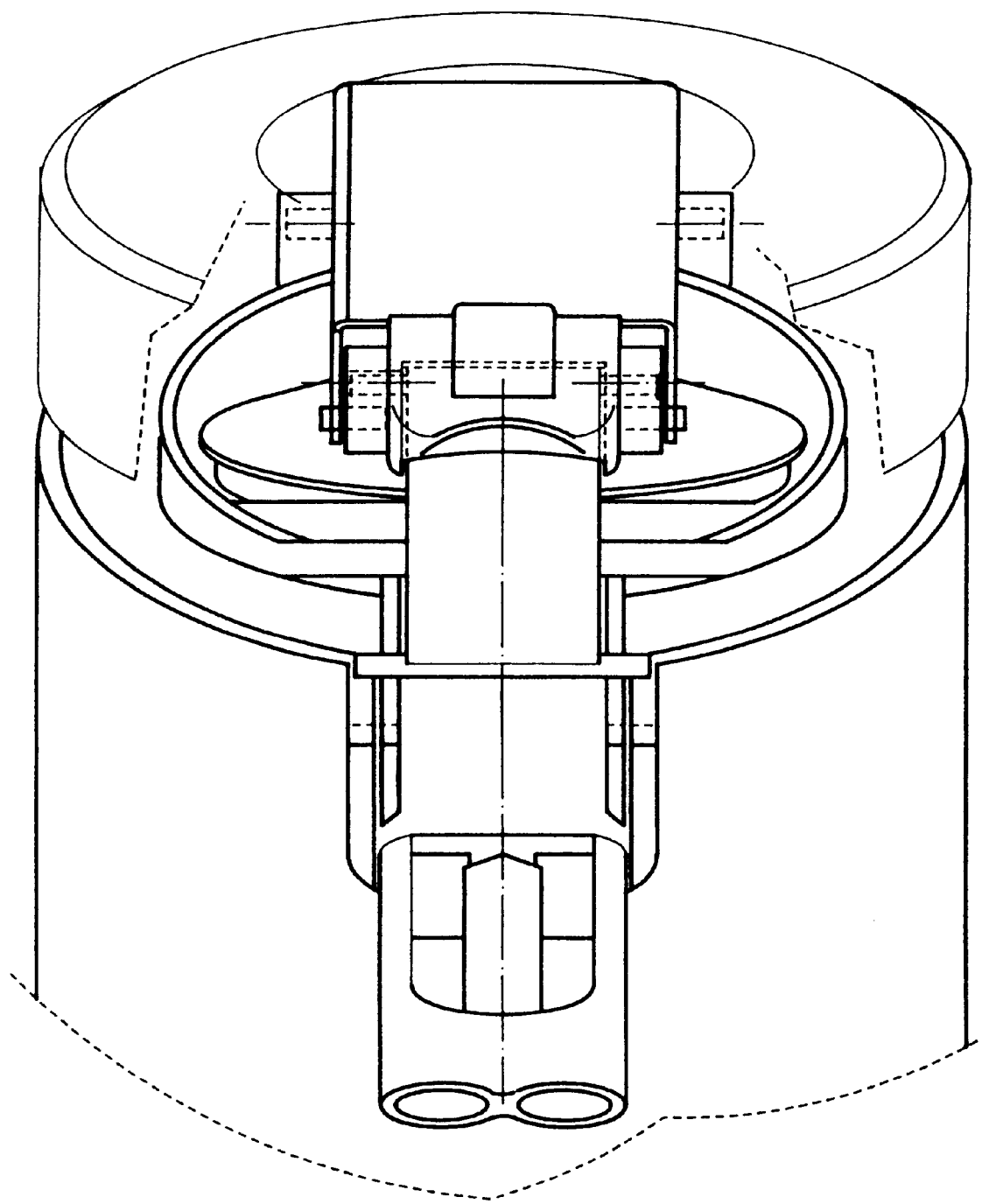

In this example, the closing arrangement 52 is provided with an operating lip 76 which is connected to the rotation element 44 adjacent the second end 48, for rotation about a rotation axis 78. Further, the closing arrangement 52 comprises a closing lip 80 which is connected to the operating lip 76 for rotation about a rotation axis 82. In the closed position, as shown in FIG. 1, the rotation axis 82 is located above the rotation axis 78, while further the distance between the rotation axis 78 and the holder 4 is less than the distance between the rotation axis 82 and the holder 4. In this example, a free end 84 of the closing lip 80 hooks under a projection 86 of the housing 2. When the closing arrangement 52 is to be opened, a free end 88 of the operating lip 76 is moved upwards, as is shown in FIG. 2. As a result, the free end 84 of the closing lip 80 will move downwards (see FIG. 2), so that the free end 84 can be detached from the projection 86. This situation is shown in FIG. 3. The spring 62a provides that the free end 84 moves in a direction away from the housing 2 and thus becomes automatically detached from the projection 86. This situation is also shown in FIG. 3. Then the operating lip 76 is moved further upwards (see FIG. 4), whereby the angle α is reduced. Then the cover can be opened further, as shown in FIGS. 5a and 5b. For closing the cover, the steps discussed with reference to FIGS. 1–5b are traversed in the opposite direction.

It is noted that the advantage of the closing arrangement 52 described above is that closing and opening the closing arrangement can be performed through a very light operation of the operating lip 76. As a result of the temporary downward movement of the closing lip 80 when the operating lip 76 is moved upwards (see FIG. 2), and the opposite effect of the closing lip 80 moving upwards when the operating lip 76 is moved downwards, a stable situation is achieved in closed condition, as shown in FIG. 1. Furthermore, by moving the operating lip from the position shown in FIG. 2 to the position shown in FIG. 1, the rotation element 44 is rotated counterclockwise about the rotation axis 50, so that the cover 34 is properly pressed onto the holder 4.

In the closed position, as shown in FIG. 1, hot water can subsequently be supplied to the duct 40. This hot water is supplied via the cover 34 to the top of the pouch 6. This hot water passes through the pouch and proceeds to collect as coffee extract in the recess 20. Then the coffee extract spouts through the spout opening 22 into the collecting reservoir 28. The collecting reservoir 28 is thus filled with coffee extract. As the coffee extract spouts into the surface of the liquid in the collecting reservoir 28, a good café crème is formed. This café crème flows via the opening 30 out of the collecting reservoir to leave the housing via the outlet opening 26.

Referring to FIGS. 6a–8b, presently a second embodiment of an apparatus according to the invention will be described. Parts corresponding to parts according to FIGS. 1–5 are provided with the same reference numerals.

A characteristic difference from the apparatus discussed earlier is that the first rotation axis 50 is located at least substantially in the plane 60 through the access opening 24 of the holder 4. Again, the first rotation axis 50 is parallel to this plane 60. An underside of the cover is located at least substantially in the plane 64 defined by the rotation axis 50 and the second end when the cover closes off the holder. This is in contrast to the apparatus according to FIG. 1, where the underside of the cover is located at least substantially below the plane defined by the rotation axis and the second end when the cover closes off the holder in the second rotational position. Accordingly, in this embodiment, the angles α and β defined in FIG. 1 are at least substantially equal to 0. Further, the first rotation axis is parallel to the plane 60 through the access opening. Furthermore, the plane 64 defined by the rotation axis 50 and the second end and the plane 60 through the opening run at least substantially parallel to each other when the cover closes off the holder in the second rotational position. This is in contrast to the apparatus according to FIG. 1, where these planes do not run parallel, but have an intersecting line 66 located adjacent the second end 48 of the rotation element 44 when the cover closes off the holder in the second rotational position.

The operation of the apparatus is as follows. When the cover has been lifted off the holder, as shown in FIGS. 8a and 8b, a pouch 6 can be placed in the holder 4, as has been discussed earlier in relation to FIGS. 1–5b. Then the second end 48 of the rotation element 44 is moved downwards manually. This situation is shown in FIGS. 7a and 7b. In the process, the cover will generally not rotate about the second rotation axis 58. Accordingly, the plane 90 through the underside of the cover remains parallel to the plane 64. In other words, the angle β is and remains approximately equal to 0 (FIG. 8a). Then, by operating the closing arrangement 52, the second end 48 is pressed downwards. This situation is shown in FIGS. 6a and 6b. In the process, the knob-shaped pressure part 68 will press in the direction of the holder 4 onto the center of the cover 34. In this way, too, it is ensured that the sealing ring 36, as a result of the force between the cover 34 and the holder 4, is loaded uniformly.

In this example, the closing arrangement 52 consists of an operating lip 76' mounted on the housing 2 for rotation about a rotation axis 78'. Further, a closing lip 80' is connected to the operating lip 76' for rotation about a rotation axis 82'. As can be seen in FIG. 8a, the rotation element 44 further comprises, adjacent its second end 48, an engagement point 92 and a pressure point 94. Further, the closing arrangement 52 comprises a spring 96 which is mounted so as to energize the operation lip 76' in the position shown in FIG. 6a, such that the operating lip 76' rotates counterclockwise about the rotation axis 78'. In the position shown in FIG. 8a, however, the spring will cause the operating lip 76' to rotate about the rotation axis 78' in an opposite direction.

The operation of the apparatus is as follows. In the position shown in FIG. 8b, a stable situation is drawn. An underside 98 on the operating lip 76 is pressed against a part 100 of the housing by the spring 96. When thereafter the second end 48 of the rotation element 44 is moved downwards, so that the rotation element 44 rotates about the rotation axis 50, pressure point 94, as shown in FIG. 7a, will contact the operating lip 76' at such a position that the operating lip 76' is rotated counterclockwise about the rotation axis 78'. As a result, the rotation axis 82' will simultaneously be moved slightly upwards in a direction of the holder 4. As a result, an underside of the closing lip 80' moves over the engagement point 92 and presses it downwards, as shown in FIG. 6a. Simultaneously with the movement of the operating lip 76' about the rotation axis 78', the closing lip 80' will turn counterclockwise about the rotation axis 82'. In the position shown in FIG. 6a, a stop 102 of the operating lip 76' provides that the closing lip 80' cannot rotate further about rotation axis 82'. In this situation, the underside of the closing lip 80' presses the engagement point 92' downwards. The spring provides that the situation, as shown in FIG. 6a, is stable.

When a pouch is placed in the holder 4 and the cover 34 closes off the holder 4, hot water can be supplied to the pouch, as discussed in relation to FIGS. 1–5.

The invention is not in any way limited to the embodiments described hereinbefore. Thus, other embodiments of the closing arrangement 52 are conceivable. Also, the holder and cover can take different shapes than shown. The holder and the cover can have, for instance, a square, instead of a circular, cross section. Also, it is not necessary to employ a collecting reservoir 28 as shown in the drawing.

Such variants are understood to fall within the scope of the invention.

I claim:

1. An apparatus for preparing coffee, comprising a holder arranged for receiving a pouch made of filter material and filled with a product to be extracted, the holder comprising at least one outflow opening and an access opening for placing the pouch in the holder, the apparatus further comprising a cover for closing and releasing the access opening and clamping means for pressing the holder and the cover towards each other when the cover closes off the access opening of the holder, wherein the clamping means for pressing the cover and the holder towards each other when the cover closes off the access opening of the holder engage at least a position of the cover located on an external surface of the cover, wherein the apparatus further comprises a housing to which the holder is detachably connected, the clamping means comprising a rotation element with a first and second opposite ends, the rotation element being connected adjacent its first end to the housing for rotation about a horizontally directed first rotation axis between a first and second rotational position for closing the access opening of the holder in the second rotational position and releasing the access opening in the first rotational position, the apparatus further comprising a closing arrangement for detachably connecting the rotation element to the housing adjacent the second end when the cover closes off the access opening in the second rotational position, the cover being connected to the rotation element such that in the second rotational position the rotation axis extends along a first side of the cover and the second end is located on a second side of the cover, located opposite the first side.

2. An apparatus according to claim 1, wherein the external surface is of at least substantially circular design.

3. An apparatus according to claim 1, wherein the cover is movably connected to the rotation element.

4. An apparatus according to claim 1, wherein the first rotation axis is located above a flat plane through the access opening of the holder.

5. An apparatus according to claim 4, characterized in that an underside of the cover is located at least substantially below a plane defined by the first rotation axis and the second end when the cover closes off the holder in the second rotational position.

6. An apparatus according to claim 5, characterized in that the first rotation axis is parallel to the plane through the access opening.

7. An apparatus according to claim 5, characterized in that the plane defined by the first rotation axis and the second end and the plane through the access opening include an acute angle when the cover closes off the holder in the second rotational position.

8. An apparatus according to claim 5, characterized in that the plane defined by the first rotation axis and the second end and the plane through the access opening have an intersecting line located adjacent the second end when the cover closes off the holder in the second rotational position.

9. An apparatus according to claim 8, characterized in that the cover is connected to the rotation element for rotation through a limited angle of rotation about a second rotation axis, the second rotation axis running at least substantially parallel to the first rotation axis.

10. An apparatus according to claim 9, characterized in that the apparatus further comprises spring means which exert such a force on the cover that an underside of the cover comes to lie approximately parallel to the plane defined by the first rotation axis and the second end by rotation of the rotation element about the second rotation axis when the cover is lifted off the holder by rotation of the rotation element about the first rotation axis.

11. An apparatus according to claim 10, characterized in that the spring means comprise a flexible hose which is attached to the cover for supplying hot water to the holder.

12. An apparatus according to claim 1, wherein the first rotation axis is located at least substantially in a flat plane through the access opening of the holder.

13. An apparatus according to claim 12, characterized in that an underside of the cover is located at least substantially in a plane defined by the rotation axis and the second end when the cover closes off the holder.

14. An apparatus according to claim 13, characterized in that the first rotation axis is parallel to the plane through the access opening.

15. An apparatus according to claim 13, characterized in that the plane defined by the rotation axis and the second end and the plane through the access opening extend at least substantially parallel to each other when the cover closes off the holder in the second rotational position.

16. An apparatus according to claim 12, characterized in that the cover is movably connected to the rotation element.

17. An apparatus according to claim 16, characterized in that the cover is connected to the rotation element for movement through a limited solid angle.

18. An apparatus according to claim 3, wherein a knob-shaped pressure part of the rotation element presses onto approximately the center of the outside of the cover when the cover closes off the access opening and the rotation element is in the second rotational position.

19. An apparatus according to claim 18, characterized in that the outside of the cover comprises a knob-shaped element which is engaged by the knob-shaped pressure part when the cover closes off the access opening and the rotation element is in the second rotational position.

* * * * *